United States Patent
Demerly

(10) Patent No.: US 9,121,866 B2
(45) Date of Patent: Sep. 1, 2015

(54) SYSTEM AND METHOD FOR INERTIAL SENSOR OFFSET COMPENSATION

(71) Applicant: Autoliv ASP, Inc., Ogden, UT (US)

(72) Inventor: Jon D. Demerly, Byron, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 111 days.

(21) Appl. No.: 13/837,088

(22) Filed: Mar. 15, 2013

(65) Prior Publication Data

US 2014/0260517 A1  Sep. 18, 2014

(51) Int. Cl.
*G01P 21/00* (2006.01)
*B60R 16/023* (2006.01)
*G01C 25/00* (2006.01)

(52) U.S. Cl.
CPC ............. *G01P 21/00* (2013.01); *B60R 16/0233* (2013.01); *G01C 25/00* (2013.01); *B60G 2600/082* (2013.01); *B60T 2250/06* (2013.01)

(58) Field of Classification Search
CPC ................. B60R 21/0132; B60R 2021/01327; B60R 16/0233; B60R 2600/082; G01P 21/00; B60T 2250/06; G01C 25/00; B60G 2600/082
USPC .................... 73/1.37, 1.38; 702/104
See application file for complete search history.

(56) References Cited

U.S. PATENT DOCUMENTS

| | | | |
|---|---|---|---|
| 5,265,472 A * | 11/1993 | Pfeifle et al. ............... | 73/514.02 |
| 5,333,819 A * | 8/1994 | Stetson, Jr. .................. | 244/164 |
| 6,314,329 B1 * | 11/2001 | Madau et al. ................ | 700/89 |
| 6,825,756 B2 | 11/2004 | Bai et al. | |
| 7,698,036 B2 * | 4/2010 | Watson et al. ............... | 701/45 |
| 7,747,383 B2 * | 6/2010 | Ohkubo et al. .............. | 701/504 |
| 8,009,971 B2 * | 8/2011 | Koo et al. .................... | 396/55 |
| 8,170,788 B2 | 5/2012 | Sjögren et al. | |
| 2003/0040856 A1 | 2/2003 | Winner et al. | |
| 2004/0030474 A1 | 2/2004 | Samuel et al. | |
| 2005/0080543 A1 | 4/2005 | Lu et al. | |
| 2006/0184300 A1 * | 8/2006 | Schubert et al. ............. | 701/45 |
| 2006/0192353 A1 * | 8/2006 | Schubert et al. ........... | 280/5.502 |
| 2008/0140291 A1 * | 6/2008 | Kobayashi et al. ........... | 701/70 |
| 2008/0208501 A1 | 8/2008 | Fiedler et al. | |
| 2011/0202305 A1 | 8/2011 | Willis et al. | |
| 2011/0301902 A1 | 12/2011 | Panagas | |
| 2011/0307205 A1 * | 12/2011 | Vassilieff ...................... | 702/96 |
| 2012/0130693 A1 * | 5/2012 | Ertas et al. .................... | 703/2 |
| 2012/0203488 A1 * | 8/2012 | Dusha ........................ | 702/104 |
| 2014/0229135 A1 * | 8/2014 | Nomura ....................... | 702/94 |

OTHER PUBLICATIONS

"Simple Moving Average" website by Christoph Heindl, published Jan. 23, 2010, downloaded Jan. 8, 2015.*

* cited by examiner

*Primary Examiner* — Peter Macchiarolo
*Assistant Examiner* — Natalie Huls
(74) *Attorney, Agent, or Firm* — Brinks Gilson & Lione

(57) ABSTRACT

The present invention provides an improved method and system for compensation of inertial sensors. In one implementation a modified moving average is applied to provide dynamic offset compensation for an inertial sensor output that is calculated when a vehicle is in motion.

13 Claims, 4 Drawing Sheets

SYSTEM AND METHOD FOR INERTIAL SENSOR OFFSET COMPENSATION

FIELD OF THE INVENTION

The present invention relates to a compensation method for a rate sensing device and more particularly to a method and system for bias offset and compensation for angular and linear inertial sensors primarily in automotive vehicles.

BACKGROUND

Inertial sensors comprise a diverse classification of sensors used to measure angular velocity and linear acceleration, with varying levels of accuracy and range. Particularly in the automotive field, inertial sensor applications have recently become more widespread and are applied in a variety of applications to improve the safety, performance, and comfort of automotive vehicles. Present applications of inertial sensors in automobiles range from advanced Anti-lock Braking Systems (ABS) that measure the longitudinal velocity and acceleration of a vehicle to determine if the chassis is still moving, to more complex systems such as driver assistance systems and even autonomous vehicle operation. In pursuit of more advanced systems, automotive manufacturers continue to push the boundaries of the capability of inertial sensors. This pursuit has created a need for innovative, cost effective solutions to improve the capability of inertial sensors.

Inertial sensors range in accuracy and performance capability, but generally suffer from some common deficiencies. Common sources of error in inertial sensor accuracy include: temperature variations, flicker noise, thermo-mechanical white noise, and bias (offset) instability. The bias of an inertial sensor output signal or rate signal refers to the initial error of the inertial sensor output compared to the true measurement values being experienced by the inertial sensor. Bias is one of the primary sources of error because if left uncorrected, it results in a steadily growing angular or linear positional error. Temperature variations due to changes in environmental conditions also cause fluctuations in the output of inertial sensors and increase the error in inertial sensor measurements. The deficiencies of inertial sensors are also emphasized when inertial sensors are applied in increasingly complex equations to model vehicle behavior. The most prominent examples of this emphasis are increased errors due to various inertial sensor measurements which may be propagated through the integral relationships among rate measurements, velocity, and position.

The combined issues related to the applications of inertial sensors demonstrate some of the limiting factors inhibiting cost-effective applications of inertial sensors. Ensuring accuracy of these sensors is imperative to promoting advanced vehicle systems that may be widely applicable in automotive vehicles. The methods and systems disclosed herein may provide for improved inertial sensor accuracy and cost-effective implementation to promote improved safety and diagnostics in automotive vehicles.

BRIEF SUMMARY

Static bias offsets may be applied to update the bias of an inertial sensor when vehicles are stopped or in some other defined condition. This process assumes that when a vehicle is stopped, the rates of the vehicle will be zero. The sensor output of an inertial sensor may be measured and recorded while the vehicle is at rest and later filtered from the sensor output when the vehicle is moving to correct for the bias of the sensor. This process introduces complications and sources of error to the already challenging process of ensuring sensor accuracy. One substantial source of error, though seemingly trivial, is determining when the vehicle is at rest, meaning that subtle movements after a vehicle has stopped have settled and that environmental conditions are not affecting sensor measurements. These issues may also become more pronounced during lengthy travel on highways when vehicles do not make frequent stops.

The present invention provides an improved method and system for compensation of inertial sensors. In one implementation a modified moving average is introduced and applied to provide dynamic offset compensation for an inertial sensor output that is calculated when a vehicle is in motion. This implementation may provide for a method of updating or filtering the output of inertial sensors while a vehicle is in motion. This method may further provide for compensation related to multiple sources of error through a filtering method that is compatible with simple and cost-effective processing or driving circuitry. Other implementations of the inertial sensor offset compensation method may include calculating a static modified moving average (MMA) of an inertial sensor output when a vehicle is stopped and dynamic MMA of an inertial sensor when the vehicle is in motion. This particular method may further provide for a transition period between the dynamic MMA and the static MMA for further improved compensation.

The implementations of the offset compensation and methods disclosed herein provide for an adaptable method of offset compensation that may be applicable to diverse range of inertial sensors and combined systems including accelerometers, gyroscopes, inertial measure units (IMUs), and other related sensory devices. Though particular implementations of the system and method of offset compensation are provided later in detail, it will be obvious to one skilled in the art that the method and system disclosed may be adapted to a broad range of applications and may provide solutions in other areas similar to those discussed in this disclosure.

In one implementation, a system is introduced that applies a common Electronic Stability Control system (ESC) to allow for widespread application of the invention with little additional cost in implementation to most new vehicles. Another implementation may provide for compensation in more advanced systems including Inertial Measurement Units (IMUs) and other advanced systems including driver assistance and autonomous operation of motor vehicles. Finally, in many instances the invention may provide for a combined compensation system including additional devices and methods of operation. The exemplary implementations disclosed herein provide for improved methods and systems for compensation of inertial sensors and particularly provide for an adaptable offset compensation method for improved inertial sensor performance while maintaining cost-effective operation.

Further areas of applicability will become apparent from the description provided herein. It should be understood that the description and specific examples are intended for purposes of illustration only and are not intended to limit the scope of the present invention.

DETAILED DESCRIPTION OF THE DRAWINGS AND THE PRESENTLY PREFERRED EMBODIMENTS

Figure 1A:
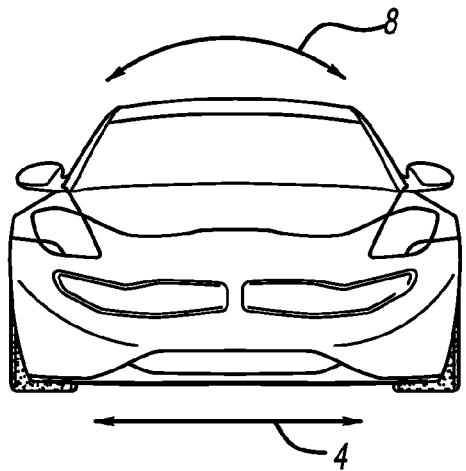
FIGS. 1A, 1B, and 1C are orthogonal views of the front, top and side respectively of an automotive vehicle in accordance with the present invention.
Figure 1B:
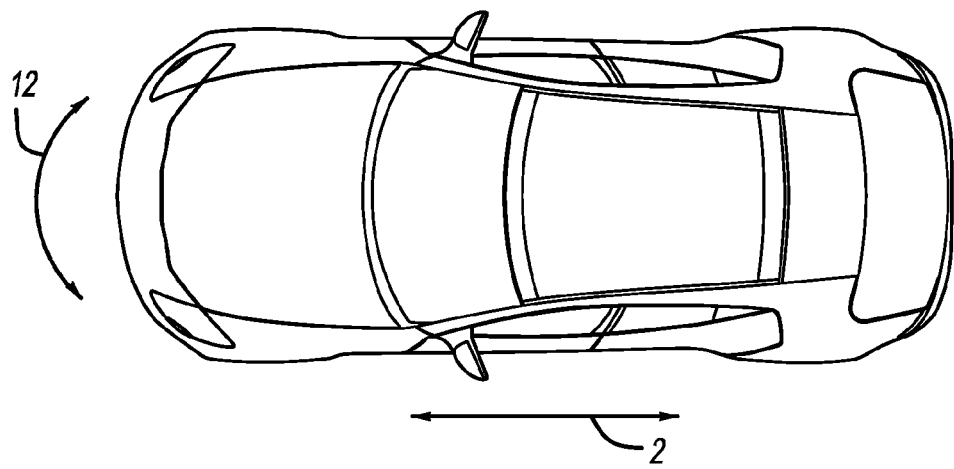
Figure 1C:
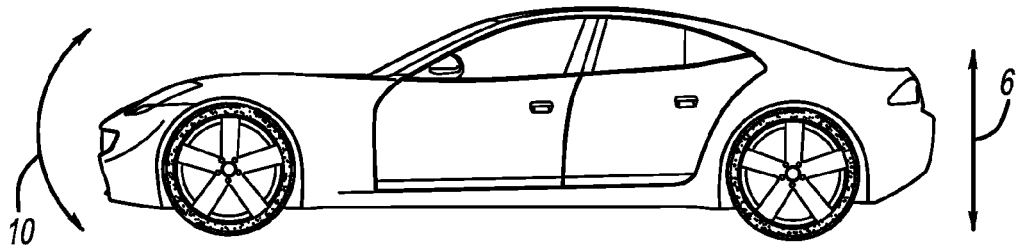

Referring to FIGS. 1A, 1B, and 1C orthographic views of the top, front, and side profiles of a motor vehicle are shown in accordance with the present invention. FIG. 1 depicts the common directions of angular and linear motion that may be measured by one or more inertial sensors. The directional and rotational components that may be measured by an inertial sensor in a vehicle application comprise linear components 2, 4, 6 and the rotational components 8, 10, 12, referred to herein as the X, Y, and Z components and the roll, pitch, and yaw components respectively. These sensors may further be offset to directly measure between the directions illustrated. Various sensors may be implemented to measure the linear and rotational components of acceleration and/or velocity that affect a vehicle during operation. Typically linear accelerometers are applied to measure linear acceleration and angular rate sensors or two or more accelerometers are applied to measure angular velocity. Though accelerometers and angular rate sensors are referred to broadly herein, specific sensor types including piezo-electric and micro-machined sensors may be applied to practice the methods and systems disclosed herein. It will also be obvious to those skilled in the art that the teachings of this invention may further be applied to a broad range of inertial sensors including gyroscopic, micro-machined capacitive, piezoelectric, acoustic wave, electro-mechanical, and any combinations thereof such as inertial measurement units (IMUs).

The widely applicable nature of the invention may provide for compensation of a broad range of inertial sensors due at least in part to commonalities in many inertial sensor outputs and similarly attributed errors in measurement. Many of the inertial sensors disclosed herein may comprise similar operation and similar sources of error including bias error, temperature effects, bias instability, and white noise. The bias of an inertial sensor output signal refers to the initial error of the inertial sensor output compared to the true measurement values of the motion acting on the inertial sensor. To correct for the bias error of inertial sensors a bias offset may be calculated from all measurements reported by the inertial sensor. Though the average error may be measured when an inertial sensor is at rest, other errors may add to the bias error over time including white noise, temperature effects and bias instability. These errors and others may combine to cause inertial sensor measurements to drift over time, and in turn, present inadequacies in static bias offset approaches.

Further, many applications of inertial sensors use rate measurements to calculate velocity, position, or heading angle by integration. Calculating integral relationships from inertial sensor measurements may cause the error associated with the inertial sensor measurements to be propagated through the integral summations causing errors that increase over time. Other sources of error and applications for the invention related to those disclosed herein will be obvious to those skilled in the art and the examples included herein are provided to promote understanding and should not be considered limiting to the invention.

A modified moving average (MMA) may be applied to compensate or filter the output signal or rate signal of an inertial sensor to correct for both bias and other inertial sensor measurement errors. The inertial sensor referred to in this implementation may be an accelerometer or rate gyro configured to measure one or more acceleration components 2, 4, 6, or angular rate components 8, 10, 12. For simplicity, the x directional component 2 is referred as a reference for this implementation. The equation for a MMA, $A_k$, for the sampled inertial sensor output, $x_k$, are shown as Equations (1) and (2), where k is the sample number and n is the number of samples for the moving average window (hereinafter window size).

$$A_k = \frac{\sum_{i=1}^{k} x_i}{i} \text{ or } A_k = \frac{A_{k-1}(k-1) + x_k}{k} \text{ for } k \leq n \tag{1}$$

$$A_k = \left(\frac{n-1}{n}\right)^{k-n} A_n + \frac{1}{n}\sum_{i=k-n}^{k}\left(\frac{n-1}{n}\right)^{k-i} x_i \tag{2}$$

or $$A_k = \frac{A_{k-1}(k-1) + x_k}{n} \text{ for } k > n$$

Applying a MMA to the output of an inertial sensor to compensate for bias error and other included errors provides for at least the benefit that less system memory is required to store the average. When calculating a standard moving average a plurality of data points must be stored extending memory requirements proportional to the window size, n. However, when applying a MMA, only the previous average calculated is saved to memory. The term memory as discussed herein applies broadly to various forms of memory, cache, non-volatile or volatile memory, and other forms that will be considered obvious to those skilled in the art.

Figure 2:
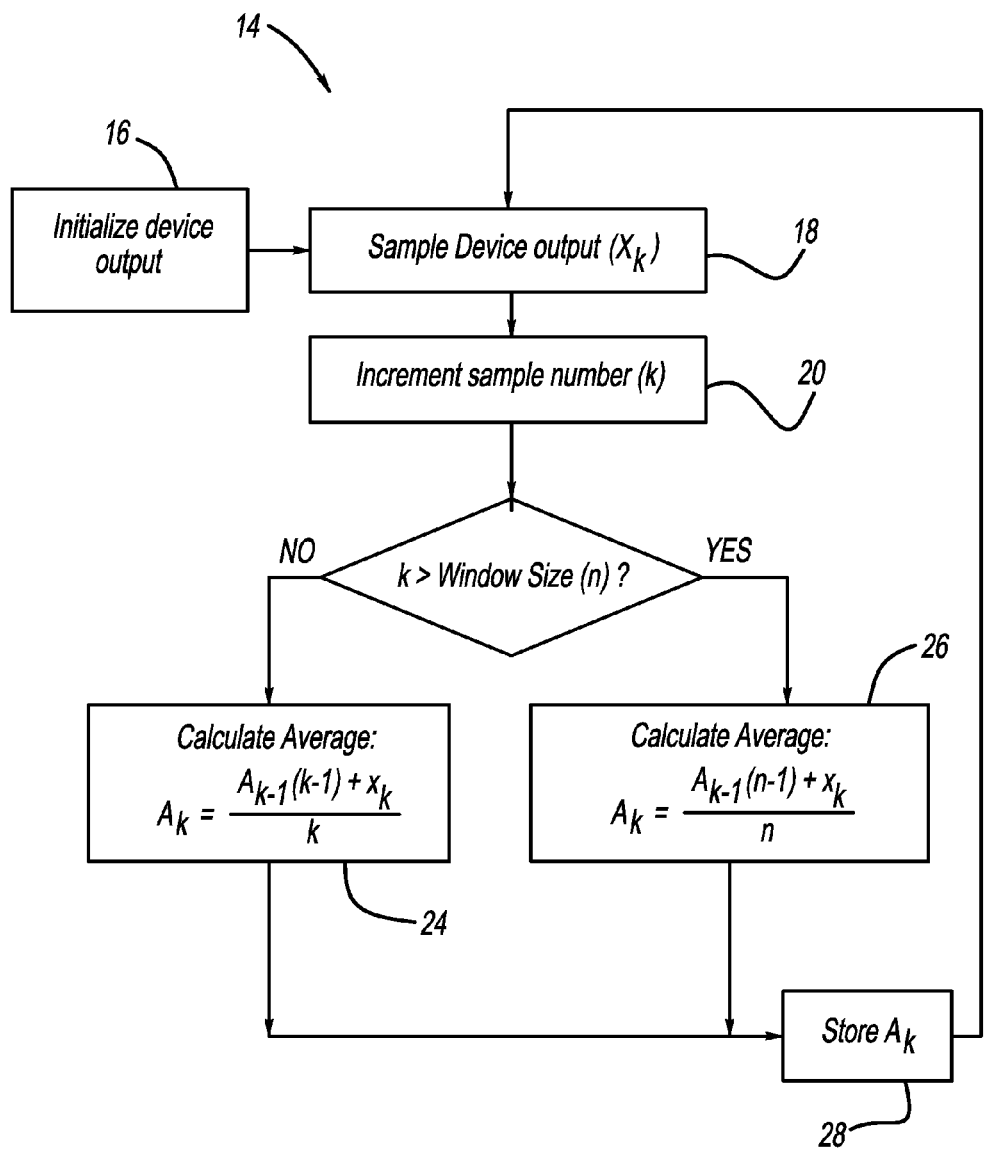
FIG. 2 is block diagram of an implementation of an inertial sensor offset compensation method in conformance with the present invention.

Referring now to FIG. 2, a block diagram of a method for compensation of an inertial sensor 14 is shown. The method may comprise starting or initializing 16 the output of an inertial sensor. Once the inertial sensor begins measuring an angular rate or linear acceleration, a sample 18, $x_k$, may be sampled from the device output and applied to increment the current sample number 20, k. The first mode of operation of the MMA begins, wherein the sample size is less than the window size, n. That is, the method samples values from the inertial sensor output 18, increments the sample number 20, and calculates the average $A_k$ 24 until the window size for the MMA is reached. The first mode of operation is calculated by applying the equation 1 for the MMA when the sample, k≤n as shown in block 24. The sampling rate may vary widely depending on the application for the inertial sensor measurement and the required resolution or timing of the application. Further discussion regarding the sampling rate and system operation is discussed later when referring to inertial sensor compensation systems. In some automotive vehicle applications the sampling rate may range from 5 Hz to 1 MHz and preferably may be approximately 100 Hz.

Once the sample size exceeds the window size, k>n, the second mode of operation for inertial sensor compensation may continue by sampling the device output and calculating the MMA as detailed in block 26. The second mode of operation of the inertial sensor compensation method may be considered to be a continuous mode of operation. The continuous mode of operation may continue to calculate the inertial sensor offset including the bias offset and the error compensation filter for the inertial sensor throughout vehicle operation. The inertial sensor offset method disclosed herein may provide for the offset of an inertial sensor to be modified 24, 26 and stored 28 throughout vehicle operation including while the vehicle is moving. This method 14 may limit drift due to errors in inertial sensor measurements to improve the accuracy and diagnostic capacity of inertial sensors especially when applied in calculating integral relationships of linear and rotational rates. The improved accuracy provided by the methods introduced herein may be applied in numerous vehicle diagnostic, navigation, and safety systems.

The window size, n, of the inertial sensor output samples, $x_k$, may vary depending on the application. In many applications the window size of the MMA may only need to be considered for the last minute of operation. This provides for a window size of n=6000 samples at a sampling rate of 100 Hz. However, the number of samples may vary drastically depending on the sampling rate or sensory response requirements of a particular system and the length of time over which to track the MMA of a particular sensor output. One beneficial aspect of this method is that it may allow for a wide variety of windows sizes and sampling rates over various time periods without any change in memory requirements which only include the previous MMA value and the counter.

The inertial sensor offset method 14 demonstrated in FIG. 2, may be applied to offset the bias and compensate for other errors of the inertial sensor as shown in Equation (3), wherein $x_k$ is the sample output from the inertial sensor, $A_k$ is the MMA of the bias offset and $x_{corrected}$ is the sampled sensor output corrected for bias error, white noise, temperature effects and bias instability.

$$x_k - A_k = x_{k\_corrected} \quad (3)$$

The MMA method for calculating the inertial sensor offset disclosed herein may rely on the assumption that the average measurement of an inertial sensor over time and throughout vehicle operations being approximately zero rather than strictly relying on measurements when the vehicle is at rest. This method may provide for an improved bias offset and inertial sensor error compensation methods by updating the offset of an inertial sensor throughout operation rather than only when the vehicle is at rest. The method disclosed herein is particularly advantageous in situations where vehicles may travel for long periods without stopping and in applications that require improved inertial sensor accuracy.

By applying a modified moving average to calculate an inertial sensor offset for the inertial sensor output, the effects of errors which may cause drift in measurements may be minimized. As discussed above, an initial static bias offset may be filtered from an inertial sensor output, but the accuracy of the inertial sensor measurement may still suffer from other errors sources including white noise, temperature effects, and bias instability that accrue throughout operation. These errors as well as others may limit the accuracy of inertial sensor measurements by causing fluctuations in measurement or drift in sensor readings. These phenomena generally may result in a loss of inertial sensor accuracy demonstrated by inaccurate rate measurements that may trend away from nominal measurements throughout operation. By applying a MMA, the drift that may otherwise be associated with inertial sensor measurements may be minimized by adjusting the offset for the inertial sensor over time throughout vehicle operation.

Figure 3:
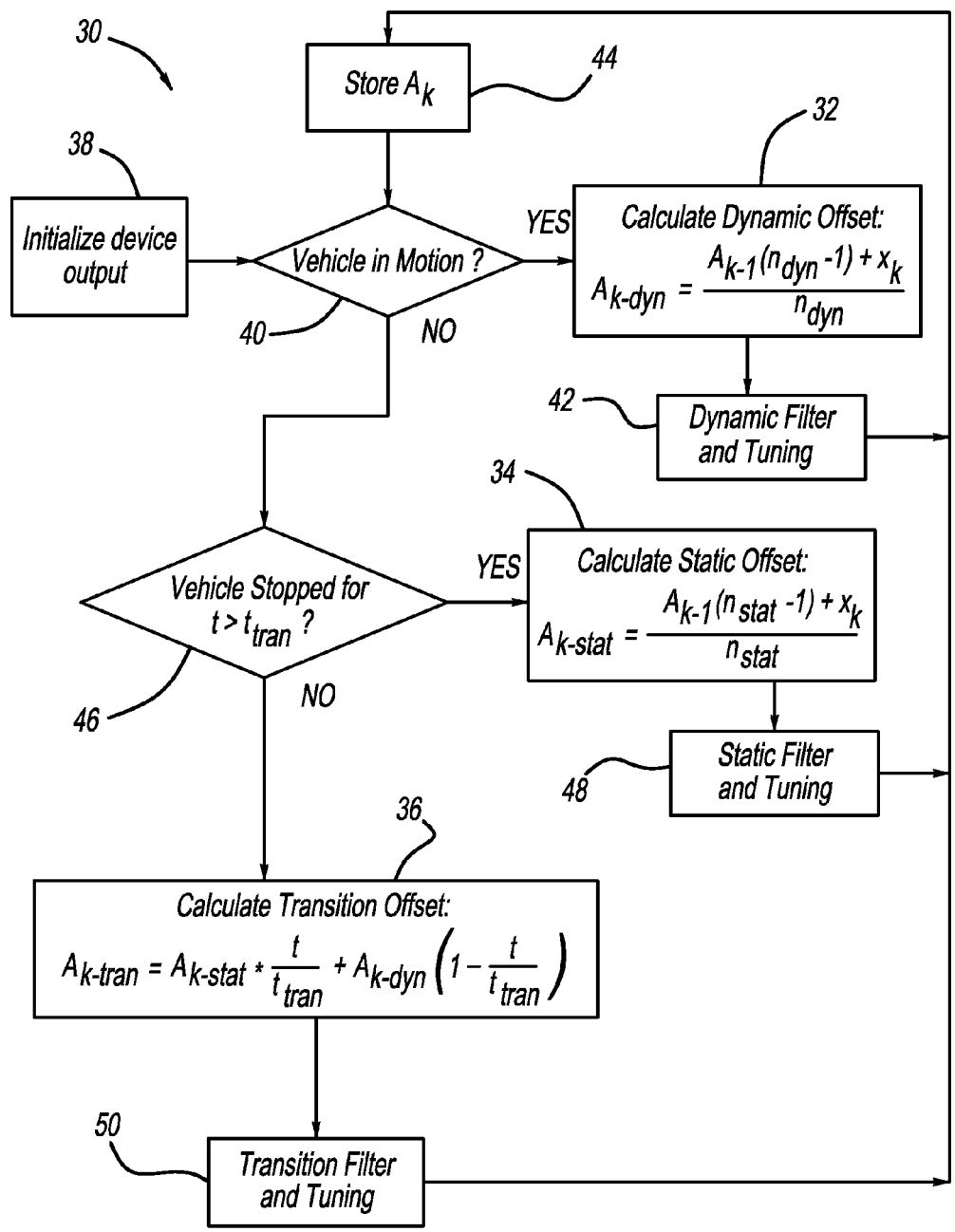
FIG. 3 is block diagram of an implementation of an inertial sensor offset compensation method in conformance with the present invention.

Referring now to FIGS. 2 and 3, in another implementation a MMA may be applied to calculate an inertial sensor offset for a compensation method 30 that applies flexible tuning filters for a broad range of inertial sensors. This exemplary method provides for calculating and tuning a MMA when a vehicle is moving and transitioning to an independently tuned MMA while the vehicle is stopped. Referring first to FIG. 2, the method 14 described to calculate and offset an inertial sensor output by calculating a MMA is similarly applied. The inertial sensor may be sampled 18 and an average, $A_k$, may be calculated by a MMA calculation depending on the window size, n, and sample number, k, according to equations 1 and 2. This MMA calculation method is also applied in the present method 30 but is further augmented to apply various filtering and tuning factors throughout operation to improve the inertial sensor offset method. In this implementation, the sample window may also widely vary depending on the specific application.

The implementation of the inertial sensor offset method 30 of FIG. 3 is shown comprising a dynamic offset 32, a static offset 34, and a transition offset 36 applied between static and dynamic operation. As in FIG. 2, the inertial sensor may be initialized 38 such that the rate measurements may be sampled 18. In this implementation, it is first determined whether the vehicle is in motion 40. This process may be determined by a plurality of methods including an inertial sensor (e.g. the inertial sensor being offset or an additional inertial sensor) configured to detect rate changes that correspond to a vehicle at rest or in motion throughout operation. Another method may include applying a wheel velocity sensor such as an Anti-lock Braking System (ABS) sensor to determine if the vehicle is moving.

In this implementation, if the vehicle is determined to be in motion 40 a dynamic offset 32 may be calculated and dynamic filtering 42 may be applied to the inertial sensor offset. The offset for the inertial sensor output, $A_k$, may then be updated 44 and filtered from the sensor output as shown in Equation (3). If the vehicle is stopped, the amount of time that the vehicle has been stopped is tracked in decision block 46. If the time the vehicle is stopped, t, exceeds the transition time, $t_{tran}$, a static offset may be calculated 34 for the inertial sensor offset. The static offset may then be filtered and tuned 48 to ensure that proper offsets are calculated for the particular system. During the transition time, $t \leq t_{tran}$, a third calculation for the inertial sensor offset may be calculated in the form of a transition offset 36. The transition offset 36 may provide for a smooth transition between periods while the vehicle is in motion 32 to when the vehicle is stopped 34 and reaches a resting state. The transition offset 36 calculation mode of operation may also provide for filtering and tuning 50 providing for a method that may be adapted to a range of sensor and measurement applications.

The dynamic, static, and transition filtering and tuning steps 42, 48, 50 may comprise one or more signal conditioning circuits, including low pass filters, high pass filters, active and/or passive filters, feedback loops, or other filters. In one implementation, the filters and filtering methods that may be applicable to tune and filter the dynamic, static, and transition offsets 42, 48, 50 may be low pass filters having varying cut-off frequencies designed to filter high pass signal noise from each of the respective offsets. The filtering and tuning steps 42, 48, 50 may further comprise application specific filtering and conditioning applied to improve the accuracy of each offset for an adaptable system capable of inertial sensor compensation for various applications.

The following systems disclosed herein may be applied to implement the methods previously introduced. In one implementation, a system 52 is introduced that may apply a common Electronic Stability Control (ESC) system to allow for widespread application of the invention with little additional cost in implementation to most new automobiles. Most new passenger vehicles are equipped with ESC or its equivalent and these systems may be adapted to provide systems similar to those discussed herein. Another implementation may provide for compensation in more advanced systems including inertial measurement units (IMUs) 54 and other advanced systems including driver assistance and autonomous operation of motor vehicles. Finally, in many instances the invention may provide for a combined compensation system including additional devices and methods of operation. The exemplary implementations disclosed herein provide for improved methods and systems for compensation of inertial sensors and particularly provide for an adaptable offset compensation methods for improved inertial sensor performance while maintaining cost-effective operation.

The methods disclosed herein may further provide for adaptable systems capable of implementing the offset compensation method of FIGS. 2 and 3 and may further be applicable to a diverse range of inertial sensors and combined systems including accelerometers, gyroscopes, inertial measure units (IMUs) and a broad range of other related sensory devices. Though particular implementations of the system and method of offset compensation are provided in detail herein, it will be understood that the method and system disclosed may be adapted to a broad range of applications and may provide similar solutions in other areas similar to those discussed herein.

Figure 4:
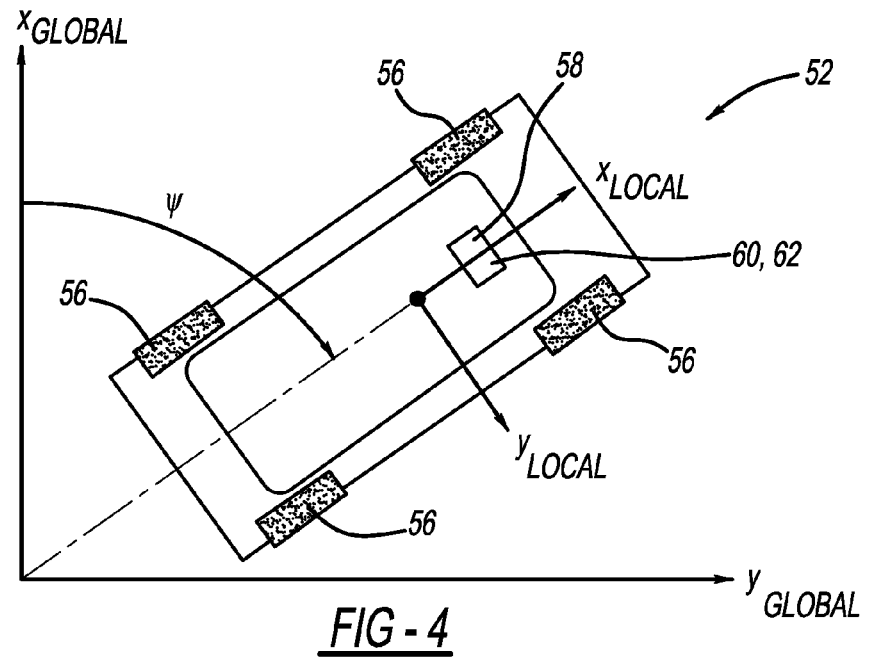
FIG. 4 is a top view of a motor vehicle demonstrating a system for inertial sensor compensation in accordance with the present invention.

Referring now to FIG. 4, an implementation of an inertial sensor compensation system 52 is introduced that may be applied with a present ESC system. ESC systems may generally comprise a plurality of wheel speed sensors 56 that may be configured to detect and measure the rotation of the front, rear, or all wheels, and a yaw rate sensor 58. Though a yaw rate sensor is referred to in this implementation of the inertial sensor compensation system, one or any combination of linear accelerometers or roll, pitch, and yaw sensors may be implemented as will be obvious to those skilled in the art. The methods introduced in reference to FIGS. 2 and 3, may be implemented in this system 52 to further demonstrate a system for inertial sensor offset compensation in conformance with the invention.

Referring now to FIGS. 2 and 4, the ESC system 52 may include a processing unit 60 configured to sample 18 the yaw rate sensor 58 output and calculate a MMA for the resulting samples. The yaw rate, $\psi$, measured by the yaw rate sensor 58 is the rate of change of the heading angle, $\psi$. As demonstrated in blocks 24 and 26 this calculation may depend on the sample number with respect to the window size. As the MMA for the yaw rate sensor 58 output is updated 28, the MMA may be stored in a memory storage unit 62. The stored MMA for the yaw rate sensor output may then be filtered or subtracted from the yaw rate sensor 58 output to offset a sensor bias and other included sources of error. Further benefits of the system disclosed herein may also be provided to limit the effect of white noise, temperature effects and bias instability that may otherwise cause trending errors. Such errors may be limited by the current system 52 because the MMA is calculated and updated to filter trending errors at all times during vehicle operation. This simple example may provide for a system that allows for improved inertial sensor measurements that may be implemented without difficulty into many present day inertial sensor applications.

The processing unit 60 described herein may comprise a dedicated processing unit configured to process and calculate the signals discussed herein, but in many instances, the processor may be implemented in an Electrical Control Unit (ECU) that may control numerous systems in the vehicle. The memory storage unit 62 may comprise various forms of memory including cache, non-volatile or volatile memory, and other forms that will be considered obvious to those skilled in the art.

The sensitivity of an inertial sensor system may be determined as a function of the sampling rate, the accuracy, and the resolution of an inertial sensor. These factors may then be applied to determine the processing requirements of a processing unit to calculate the inertial sensor offset for a particular system. In some automotive vehicle applications the sampling rate may range from 5 Hz to 1 MHz and preferably may be approximately 100 Hz. The operating parameters of the systems disclosed herein may vary depending on the specific application. The analysis required to determine the various parameters (e.g. sampling rate) for the systems described herein are well-known in the art.

Referring now to FIGS. 2 and 4, the method introduced in FIG. 3 may also be implemented in a common ESC system. In addition to the method introduced in FIG. 2, the current implementation of the system may further provide for a dynamic offset 32, a static offset 34 and a transition offset 36 applied between static and dynamic operation. The wheel speed sensor 56 may be utilized in the system to detect whether the vehicle is in motion or stopped. When the vehicle is in motion, the processing unit 60 may be configured to calculate the dynamic offset 32. Once the vehicle has stopped 56, as detected by the wheel speed sensor 40, the processing unit may then adjust calculations to calculate a transition offset 36. After the transition time has lapsed 46 with the vehicle still stopped, the processing unit 60 may calculate a static offset 34. This implementation may provide for the added benefit that each mode of vehicle operation (i.e. moving, transitioning, stopped) may have unique filtering and tuning capability 42, 48, 50. This implementation may also provide for different window sizes, $n_{dyn}$ and $n_{stat}$, for the dynamic offset 32 and the static offset 34 respectively. The filtering and tuning processes may be adjusted for a variety of vehicles to ensure optimum performance of the inertial sensor compensation system.

Figure 5:
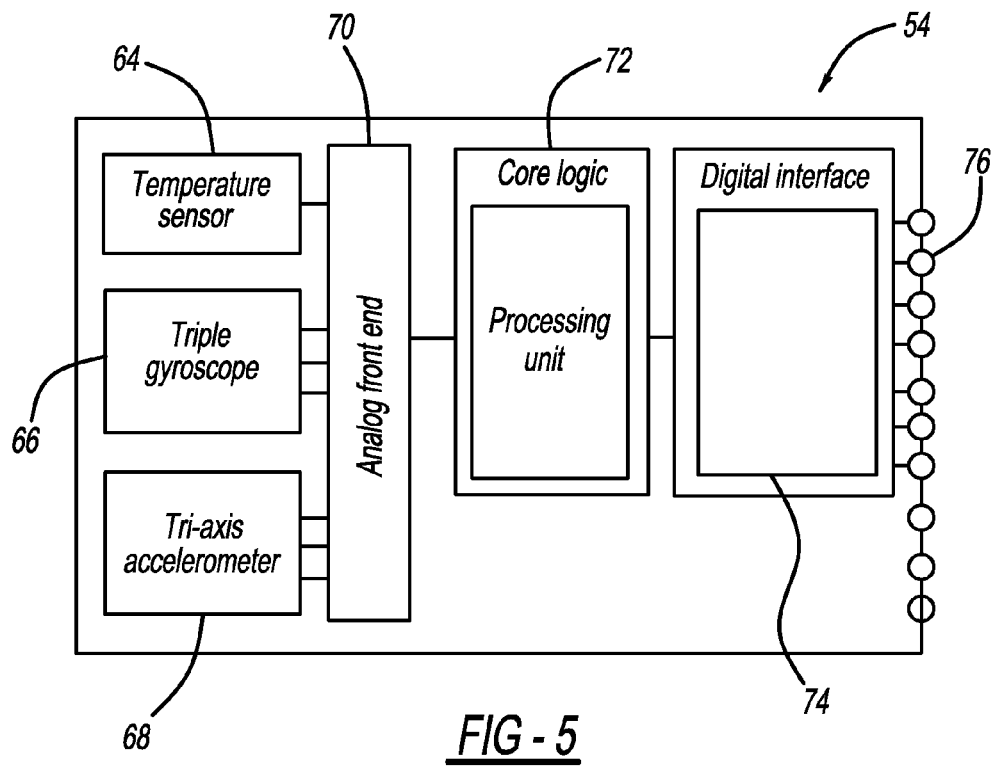
FIG. 5 is a diagram of an inertial measurement unit implementation of an inertial sensor compensation system in conformance with the present invention.

Referring now to FIG. 5, a typical IMU 54 is illustrated that may also be configured to implement the disclosed inertial sensor compensation system. The IMU 54 may generally comprise a temperature sensor 64, and a plurality of inertial sensors including a triple gyroscope 66 and a tri-axis accelerometer 68 or any combination of sensors configured to measure any combination of the six degrees of freedom introduced in FIG. 1. The temperature sensor 64 may be used for temperature compensation of sensors. The IMU 54 may further comprise an analog front end 70 and a processing unit 72. The signals from each of the sensors 64, 66, and 68 may be processed by the processing unit and each of their respective signals may be reported through the digital interface 74. The inertial sensors of the IMU 54 may have similar output signals to the yaw rate sensor 58 and may further provide for similar operation as in the ESC system. The various signal sent and received from the IMU 54 may be communicated through a plurality of I/O pins 76. In this implementation, any of the inertial sensor outputs for the triple gyroscope 66 and the tri-axis accelerometer 68 may be compensated by applying the methods introduced in FIGS. 2 and 3.

In another implementation, the x-axis of the tri-axis accelerometer 68 may be aligned with the fore aft direction of the vehicle 2. In this implementation, the x-axis accelerometer may be configured to monitor the vehicle and determine if the vehicle is in motion or stopped. Similar to the ESC system implementation 52, the x-axis of the accelerometer may serve similar to a wheel speed sensor 56 to determine if the vehicle is in motion. With this information, each of the outputs of the IMU sensors 66 and 68 may be compensated similar to the yaw rate sensor by applying the methods introduced in FIGS. 2 and 3.

Other implementations of the inertial sensor offset compensation system may be applied to various other inertial sensors and may further include inertial sensor compensation systems comprising a plurality of other devices to improve and verify inertial sensor accuracy. The systems disclosed herein may be combined with a Global Positioning System (GPS) to provide for additional correction for inertial sensor offset compensation. The correction from the GPS may comprise offsetting an inertial signal to match a global direction, position, or rate comprising latitude, longitude, speed, or heading. Other implementations may further implement temperature sensors to further enhance system performance. The various implementations described herein provide for an inertial sensor offset compensation method for various inertial sensors and implementations.

The inertial sensor offset compensation methods and systems described herein may be embodied in other forms without departing from its spirit or characteristics. The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A sensor compensation system for a motor vehicle comprising:
an inertial sensor configured to measure a rate of a vehicle;
a processing unit in communication with the inertial sensor;
a memory unit operably coupled to the processing unit; and
the processing unit including at least one module configured to:
sample a series of data from the inertial sensor;
calculate a modified moving average from the series of data and a current data sample from the series of data to calculate a compensation offset, wherein the modified moving average is an average based on a previously determined average; and
filter the compensation offset from the series of data to generate a compensated rate signal, wherein the memory unit stores a current average from the modified moving average to calculate a subsequent modified moving average for the series of data; and
wherein the modified moving averages, $A_k$, for the sampled inertial sensor output, $x_k$, where k is the sample number and n is the number of samples for a moving average window is determined by the following equations:

$$A_k = \frac{\sum_{i=1}^{k} x_i}{i} \text{ or } A_k = \frac{A_{k-1}(k-1)+x_k}{k} \text{ for } k \leq n \quad (1)$$

$$A_k = \left(\frac{n-1}{n}\right)^{k-n} A_n + \frac{1}{n}\sum_{i=k-n}^{k}\left(\frac{n-1}{n}\right)^{k-i} x_i \text{ or } A_k = \frac{A_{k-1}(k-1)+x_k}{n} \text{ for } k > n. \quad (2)$$

2. The sensor compensation system of claim 1, wherein the series of data is sampled when the vehicle is in motion.

3. The sensor compensation system of claim 1, wherein the inertial sensor is an angular rate sensor.

4. The sensor compensation system of claim 1, further comprising a second sensor configured to detect motion of the vehicle in communication with the processor.

5. The sensor compensation system of claim 4, wherein the second sensor configured to detect motion is a wheel speed sensor.

6. The sensor compensation system of claim 4, wherein the second sensor configured to detect motion is an accelerometer.

7. The sensor compensation system of claim 4, wherein the at least one module is configured to calculate a dynamic modified moving average in response to a signal from the sensor configured to detect motion.

8. The sensor compensation system of claim 7, wherein the at least one module is configured to calculate a transition modified moving average between the static modified moving average and the dynamic modified moving average to calculate the compensation offset.

9. The sensor compensation system of claim 4, wherein the at least one module is configured to calculate a static modified moving average in response to a signal from the sensor configured to detect motion.

10. A method of compensation for an inertial sensor comprising:
measuring a rate signal of a motor vehicle;
calculating an inertial sensor compensation offset including:
sampling a series of data from the rate signal;
calculating a dynamic modified moving average from the series of data measured in response to the vehicle in motion, and a static modified moving average in response the vehicle being stopped to calculate a compensation offset, wherein the static and dynamic modified moving averages are each an average based on a previously determined average;
filtering the compensation offset from the rate signal; and
generating a compensated rate signal; and
wherein each of the static and dynamic modified moving averages, $A_k$, for the sampled inertial sensor output, $x_k$, where k is the sample number and n is the number of samples for a moving average window is determined by the following equations:

$$A_k = \frac{\sum_{i=1}^{k} x_i}{i} \text{ or } A_k = \frac{A_{k-1}(k-1)+x_k}{k} \text{ for } k \leq n \quad (1)$$

$$A_k = \left(\frac{n-1}{n}\right)^{k-n} A_n + \frac{1}{n}\sum_{i=k-n}^{k}\left(\frac{n-1}{n}\right)^{k-i} x_i \text{ or } A_k = \frac{A_{k-1}(k-1) + x_k}{n} \text{ for } k > n. \quad (2)$$

11. The method of claim 10, further comprising calculating a transition modified moving average between the static modified moving average and the dynamic modified moving average to calculate the compensation offset.

12. The method of claim 10, wherein the modified moving average is filtered by a low pass filtering process.

13. The method of claim 10, wherein the dynamic modified moving average is filtered separately from the static modified moving average.

\* \* \* \* \*